J. W. LAMBERT.
FRICTION TRANSMISSION MECHANISM.
APPLICATION FILED JUNE 9, 1910.
1,011,449.
Patented Dec. 12, 1911.
2 SHEETS—SHEET 1.
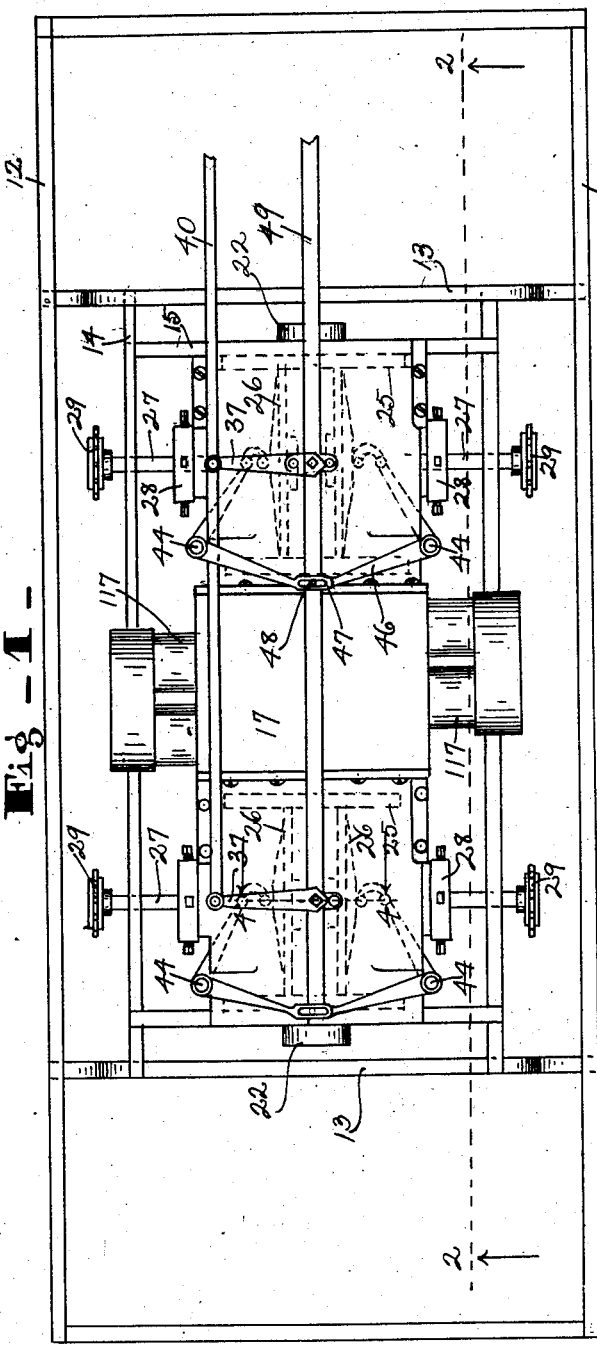
Fig-1-
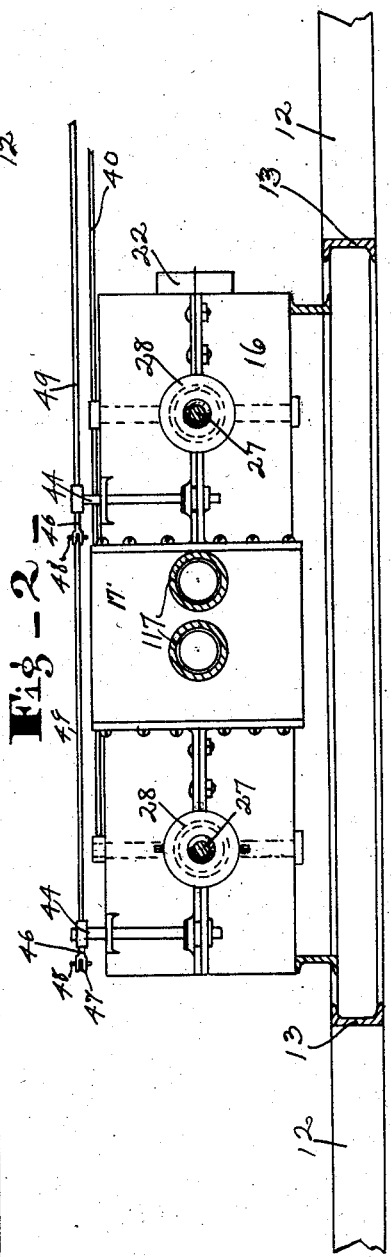
Fig-2-
WITNESSES:
INVENTOR.
John W. Lambert
BY
ATTORNEY.

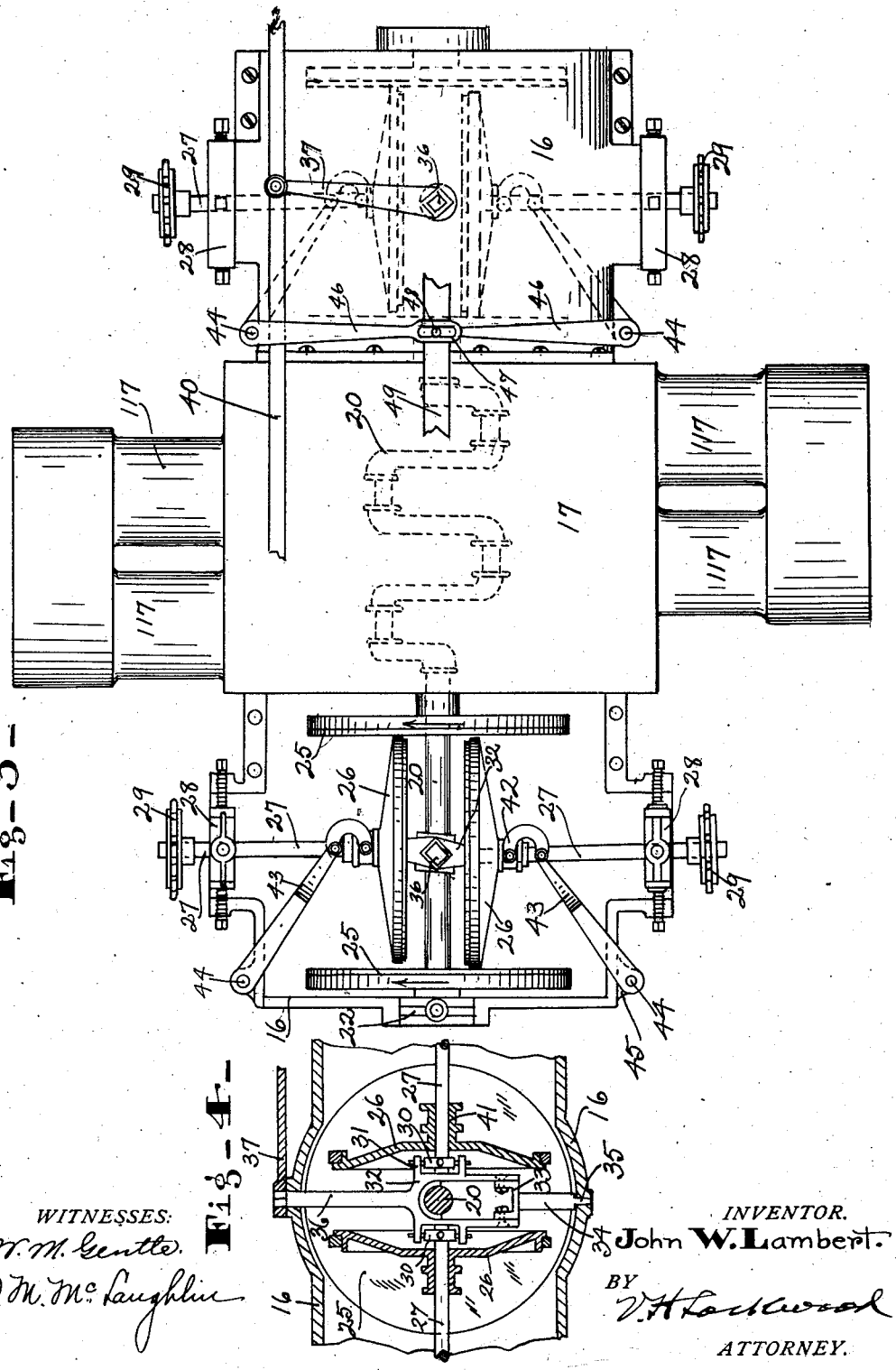

1. # UNITED STATES PATENT OFFICE.

JOHN W. LAMBERT, OF ANDERSON, INDIANA, ASSIGNOR TO THE BUCKEYE MANUFACTURING COMPANY, OF ANDERSON, INDIANA, A CORPORATION OF INDIANA.

FRICTION TRANSMISSION MECHANISM.

1,011,449.   Specification of Letters Patent.   Patented Dec. 12, 1911.

Application filed June 9, 1910. Serial No. 566,002.

*To all whom it may concern:*

Be it known that I, JOHN W. LAMBERT, of Anderson, county of Madison, and State of Indiana, have invented a certain new and useful Friction Transmission Mechanism; and I do hereby declare that the following is a full, clear, and exact description thereof, reference being had to the accompanying drawings.
The object of this invention is to improve certain parts of the construction set forth in my former application, Serial No. 564,151, filed May 31, 1910, by way of rendering the construction more compact and suitable for mounting in connection with an ordinary street car and yet obtaining the advantages resulting from the prior construction which cause the friction members to have sufficient frictional engagement to transmit the desired amount of power to run a street or interurban car.

To that end the engine is located between the groups of friction transmission systems, and said systems are mounted immediately in connection with the ends of the crank shaft which extend in each direction from the engine. This brings all the parts very close together and enables them to be mounted in a single compartment suspended beneath the body of a car at ordinary height.

The nature of the invention will be understood from the accompanying drawings and the following description and claims.

In the drawings Figure 1 is a plan view of the power generating and transmitting mechanism and frame on which it is mounted, showing parts by dotted lines in idle position. Fig. 2 is a side elevation of what appears in Fig. 1, parts being in section on the line 2—2 of Fig. 1. Fig. 3 is a plan view of the right-hand end of the casing and associated parts, and a plan view of the engine and the left-hand portion of the friction transmission mechanism with the upper part of the casing removed, parts being shown by dotted lines. Fig. 4 is a vertical transverse section on the line 4—4 of Fig. 1.

The wheels, axles and truck of the street car with which this mechanism is peculiarly adapted to be used is not herein shown, but a frame 12 is provided which is adapted to be carried by the truck frame of the street car, and it has cross bars 13 which carry another frame consisting of side bars 14 and end bars 15 and which supports the engine and casing 16 which inclose the friction transmission means. The casing 16 is double at each end of the device and each end portion is formed of lower and upper halves of similar conformation. Said end portions are bolted to the sides of the gasolene engine 17. The engine extends transversely of the device and has two cylinders 117 extending from each side thereof and the crank shaft 20 is indicated by dotted lines in Fig. 3, and the ends of the crank shaft extend in each direction therefrom and their outer ends are mounted in bearings 22 in the ends of the casing 16.

At each end of the device, that is, within each chamber of the casing 16, a pair of transversely disposed driving friction wheels 25 are rigidly secured to the driving shaft 20 and located opposite each other, and intermediate said driving friction wheels there are longitudinally disposed friction wheels 26 one on each side of the shaft 20 and independently mounted upon the inner ends of transversely extending shafts 27. The shafts 27 at their outer ends are mounted in bearings 28 in the sides of the casing which permit the lateral movement of the inner ends of the shafts. The shafts 27 project beyond the casing and carry sprocket wheels 29 whereby power is transmitted to the axle of the car. The inner ends of the shafts 27 are mounted in bearings 30, which are pivoted between the flanges 31 of an oscillatory frame 32 loosely astride the shaft 20 but not engaging the same, and left so as to oscillate. Its lower ends are connected by a plate 33 from which a support 34 extends downwardly, and at its extreme end has a reduced portion 35 which fits in a hole in the casing 16, thus leaving shoulders which rest upon the casing 16 and help support the structure therein. The bar 36 extends up from the frame 32 through the upper side of the casing 16 and on its upper end has a crank 37 rigidly secured to it. Operation of the crank 37 causes a rocking or oscillatory movement of the frame 32 from the normal position shown in Fig. 1 to the position shown in Fig. 2, where the parts are in position for the car to move forwardly or to the right, as shown. Two ends of the mechanism are simultaneously operated which moves the arm 37 to the position shown at the right-hand end of Fig. 3.

That moves one driven wheel 26 into driving engagement with one driving wheel 25 and the other driven wheel 26 with the other driving wheel 25. A reverse movement of the arm 37 will place the driven disks in the opposite relation shown in Fig. 3, and cause a reversal of the mechanism or car. In order that the two groups of friction transmission systems may be similarly and simultaneously operated, the outer ends of the arms 37 are pivoted to a bar 40 which lies upon the casing 16 and on top of the engine and extends to the forward end of the vestibule of the car where means are provided for causing the longitudinal movement of said bar 40.

In order to change the speed of the power transmitting mechanism, the driven friction wheels 26 are slidably mounted on the shafts 27 but so as to locate the same. The driven friction wheel 26 has a hub 41 peripherally grooved to receive a frame 42 which is curved at its upper end and pivoted to the yoked ends of the bar 43, which is secured to a vertical rod 44 mounted in the ears 45 outside the frame and extending up and having secured upon its upper end an arm 46 with a slot 47 in the end thereof which engages the pin 48 in a longitudinal sliding bar 49 mounted upon the casing and engine and extending forwardly to the vestibule of the car where means are provided for the longitudinal movement of said bar 49. The two groups of friction transmission means are similarly formed in the respects just mentioned, and hence, a movement of the bar 49 to the right from the position shown in Fig. 9 will tend to move the driven friction wheels away from the centers of the driving friction wheels and thus increase the speed. An opposite movement will cause the opposite result. The arms 43 and 46 and the rod 44 are rigid and constitute substantially a bell crank lever.

Thus it is observed that while there are two groups of friction transmission systems, each containing two systems of friction transmission and adapted to transmit power to four points on the axles of the driven means, the construction is very compact inasmuch as the engine is located between said groups of said friction transmission systems, and the casings inclosing said friction transmission systems are secured to the sides of the engine. This compactness conserves power, as there is little chance of play of parts or loss of power due to distant transmission.

I claim as my invention:

1. The combination of an engine with an engine shaft extending in opposite directions therefrom, a casing secured to each side of the engine in which the outer ends of the engine shaft are mounted, and friction transmission means mounted within said casing and in connection with said shaft.

2. The combination of an engine with a shaft extending in opposite directions therefrom, a casing secured to each side of the engine in which the outer ends of the engine shaft are mounted, a pair of driving friction wheels secured on each end of said shaft within each chamber of said casing, a pair of independently mounted intermediate driven friction wheels one on each side of said shaft, and means for causing all of said friction transmission means to operate as a unit.

3. The combination of an engine with a shaft extending in opposite directions therefrom, a casing secured to each side of the engine in which the outer ends of the engine shaft are mounted, a pair of driving friction wheels secured on each end of said shaft within each chamber of said casing, a pair of independently mounted intermediate driven friction wheels one on each side of said shaft, means for transmitting power from each driven friction wheel, and means for simultaneously operating all of said driven friction wheels so as to move them into or out of frictional engagement with said driving wheels.

4. The combination of an engine with a shaft extending in opposite directions therefrom, a casing secured to each side of the engine in which the outer ends of the engine shaft are mounted, a pair of driving friction wheels secured on each end of said shaft within each chamber of said casing, a pair of intermediate driven friction wheels one on each side of said shaft, a driven shaft on which each friction wheel is mounted at its inner end, means for mounting each driven shaft near its outer end in said casing so that the inner end of the shaft may have lateral movement, oscillatory means extending vertically through the casing in which the inner ends of said driven shafts are mounted, and means outside the casing for simultaneously oscillating all of said driven friction wheels.

5. The combination of an engine with a shaft extending in opposite directions therefrom, a casing secured to each side of the engine in which the outer ends of the engine shaft are mounted, a pair of driving friction wheels secured on each end of said shaft within each chamber of said casing, a pair of intermediate driven friction wheels one on each side of said shaft, a driven shaft on which each friction wheel is mounted at its inner end, means for mounting each driven shaft near its outer end in said casing so that the inner end of the shaft may have lateral movement, a frame extending vertically in the casing between the driven wheels and driven shaft and supported by the casing so that the same may be oscillatory and in which the inner ends of the driven shafts are loosely mounted, arms secured to said frame above the casing, and a longitudinal bar pivotally connected to the outer ends of said arms for causing the operation thereof.

6. The combination of an engine with a shaft extending in opposite directions therefrom, a casing secured to each side of the engine in which the outer ends of the shaft are mounted, a pair of driving friction wheels secured on each end of said shaft within each chamber of said casing, a pair of driven friction wheels between the driving friction wheels with one of said driven wheels on each side of said shaft, a driven shaft on which each friction wheel is mounted at its inner end so as to be slidable thereon and yet turn the same, means for mounting each driven shaft near its outer end in said casing so the inner end thereof may have lateral movement, a frame extending vertically in the casing between the driven wheels and driven shaft and supported by the casing so that the same may be oscillatory and in which the inner ends of the driven shafts are loosely mounted, arms secured to said frame outside the casing, a longitudinal bar pivotally connected to the outer ends of said arms for causing the movements of the driven wheels in opposite directions into or out of engagement with the driving wheels, a bell crank lever mounted in the casing for each driven friction wheel, means connecting one arm of each bell crank lever with each driven friction wheel so as to slide the same on the shaft, and a longitudinal movable bar pivotally connected with the other arms of all the bell crank levers for simultaneously operating them and moving the driven wheels toward or away from the centers of the driving wheels.

In witness whereof, I have hereunto affixed my signature in the presence of the witnesses herein named.

JOHN W. LAMBERT.

Witnesses:
 JEANNETTE ZWICKEL,
 GRACE MCCONNELL.

Copies of this patent may be obtained for five cents each, by addressing the "Commissioner of Patents, Washington, D. C."